United States Patent
Stevens

(10) Patent No.: US 7,274,488 B2
(45) Date of Patent: Sep. 25, 2007

(54) DETECTING GRAPHICS IN COLOR RENDERING DICTIONARIES

(75) Inventor: Michael T. Stevens, Aloha, OR (US)

(73) Assignee: Xerox Corporation, Rochester, NY (US)

( * ) Notice: Subject to any disclaimer, the term of this patent is extended or adjusted under 35 U.S.C. 154(b) by 883 days.

(21) Appl. No.: 10/235,684

(22) Filed: Sep. 5, 2002

(65) Prior Publication Data

US 2004/0046979 A1 Mar. 11, 2004

(51) Int. Cl.
- H04N 1/60 (2006.01)
- G06K 9/00 (2006.01)
- G09G 5/02 (2006.01)

(52) U.S. Cl. ........... 358/1.9; 358/2.1; 358/518; 358/523; 358/3.23; 382/162; 382/167; 345/501; 345/619; 345/589; 345/601; 345/602; 345/603

(58) Field of Classification Search ........... 358/1.9, 358/523, 539, 518, 530, 1.6, 1.17, 1.18, 1.13–1.15, 358/468, 1.2, 1.11, 1.1, 407, 2.1, 3.23; 382/162, 382/167; 345/501, 619, 589, 601–603

See application file for complete search history.

(56) References Cited

U.S. PATENT DOCUMENTS

| | | | | |
|---|---|---|---|---|
| 5,243,414 A | | 9/1993 | Dalrymple et al. | 358/500 |
| 5,583,666 A | * | 12/1996 | Ellson et al. | 358/518 |
| 5,838,333 A | * | 11/1998 | Matsuo | 345/604 |
| 5,966,462 A | | 10/1999 | Linder et al. | 382/173 |
| 6,031,628 A | | 2/2000 | Jacob et al. | 358/1.9 |
| 6,252,677 B1 | * | 6/2001 | Hawes et al. | 358/1.9 |
| 6,327,052 B1 | * | 12/2001 | Falk | 358/1.9 |
| 6,930,790 B1 | * | 8/2005 | Forthoffer | 358/1.15 |
| 2006/0036681 A1 | * | 2/2006 | Friedman et al. | 709/203 |

* cited by examiner

Primary Examiner—Kimberly Williams
Assistant Examiner—Charlotte M. Baker
(74) Attorney, Agent, or Firm—Oliff & Berridge, PLC

(57) ABSTRACT

Differentiating between image and graphic objects contained within a Color Rendering Dictionary improves printing efficiency. The differentiation between image and graphic objects is accomplished by monitoring the sequence in which Color Rendering Dictionary procedures are executed. Based on the monitored sequence, an image or graphic object is determined to be used for rendering.

20 Claims, 10 Drawing Sheets

DETECTING GRAPHICS IN COLOR RENDERING DICTIONARIES

CROSS-REFERENCE TO RELATED APPLICATION

The present application is related to the following co-pending application: Ser. No. 10/235,616 Dynamic Color Rendering Dictionaries", filed on the same date as the present application and commonly assigned to the present assignee, the contents of which are herein incorporated by reference.

BACKGROUND

Computer-based imaging systems have become popular for producing both electronic and hard copy images due in part to the proliferation and availability of desktop publishing programs. In such systems, a host computer typically generates data that describes the image and then transfers the data to an image-generating device where it is converted into a format that can be used by the device. Commonly, the image data is in the format of a page description language (PDL), such as, for example, PostScript available from Adobe.

Page description language, i.e., PostScript, compatible desktop publishing and other image producing application programs generate graphic commands which are converted into page description language commands. An imaging device, such as, for example, a printer or display device interprets the page description language commands so that the proper type and sequence of graphics operations can be performed to generate or render the images created in the desktop publishing program. The graphics operations typically include text, graphics, and pictorial (bitmap) operations that are performed on image objects in response to imaging operators imbedded in the page description language. Color Render Dictionaries (CRD) are a mechanism created by Adobe to provide device independent color. Conceptually the application specifies color in a device independent way. The printer then uses its CRD to convert the device independent color to a best matching CMYK value specific to the printer.

The Color Rendering Dictionaries were designed to provide identical color for both graphics and images. In practice, the best color match for graphics is significantly different than the best color match for images. A good graphics color match will produce punchy saturated colors at the cost of matching lightness and/or hue. In contrast a good image color match will sacrifice saturation in order to better preserve hue and lightness. Traditional approaches to generating color render dictionaries involve finding the best compromise between the color matching styles. The ability to provide a multitude of color behaviors within a single Color Render Dictionary alleviates the need to make this compromise. This results in over-all better color matching.

Beneath the interface, Adobe core code uses a CRD in two distinct ways. Graphic objects require only a single color calculation. For these sorts of objects the number of CPU cycles used to calculate the proper color is relatively small. Rendering bitmapped images may involve calculating millions of distinct colors. The number of CPU cycles used to calculate colors in images can be quite large. For this reason Adobe created two color pipelines. The accurate color pipeline is the most accurate but is relatively slow. The fast color pipeline is faster, but the resulting calculation is not as accurate. Graphic objects use the accurate color pipeline. Images use the fast color pipeline.

A critical part of switching color behaviors based on the object types consists of the task of "detecting" the object type being rendered. This question may easily be phrased as, "Am I rendering an image or a graphic object?" Postscript does not provide an explicit mechanism for making such a query. Therefore a need exists for quickly determining whether an image or graphic is desired while simultaneously rendering the appropriate color.

SUMMARY

A method for differentiating between image and graphic objects contained within a Color Rendering Dictionary is disclosed. The differentiation between image and graphic objects is accomplished by monitoring the sequence in which Color Rendering Dictionary procedures are executed.

Additional objects and advantages of this invention will be apparent from the following detailed description that proceeds with reference to the accompanying drawings.

DETAILED DESCRIPTION

Figure 1:
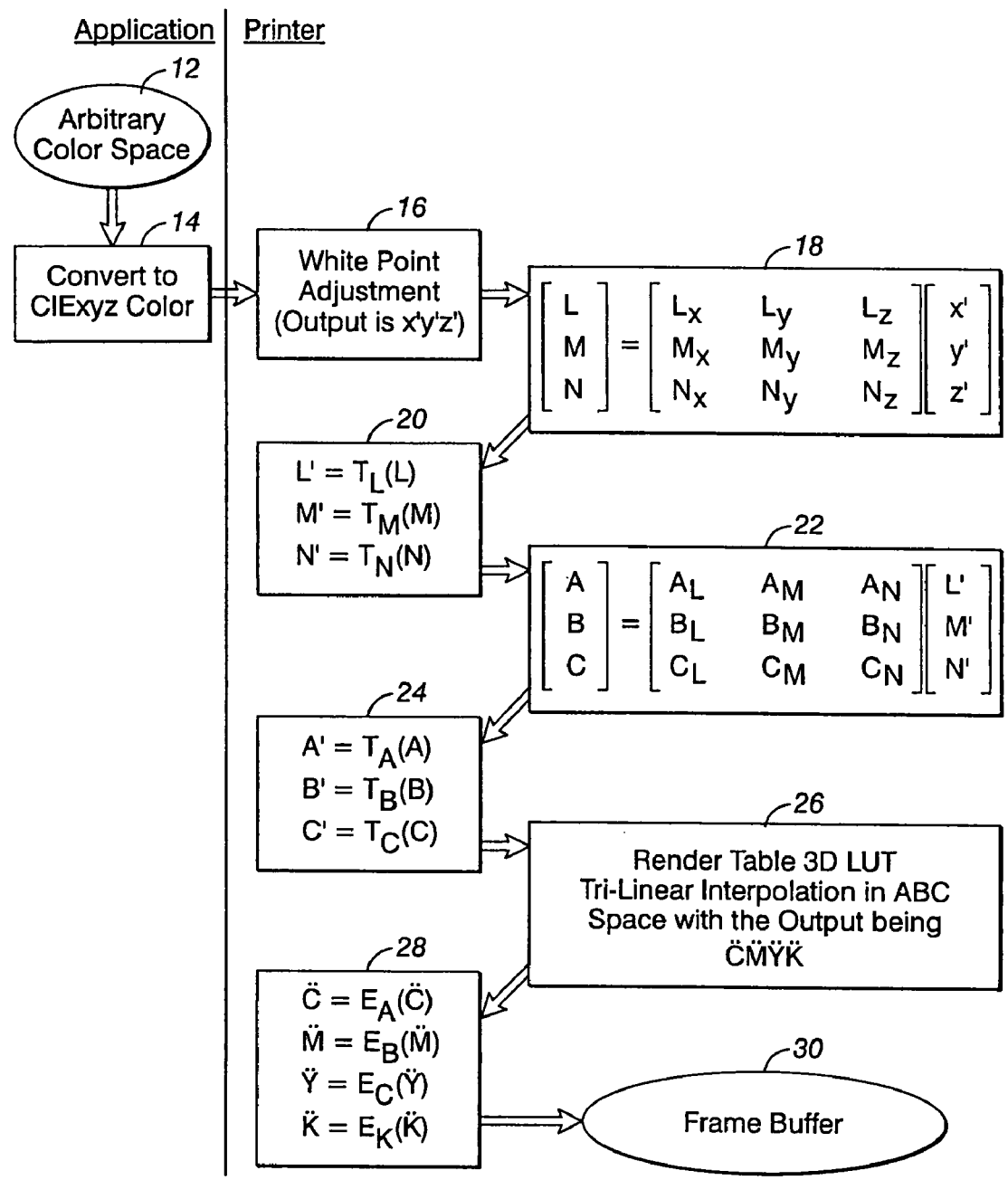
FIG. 1 illustrates a block diagram of a Color Render Dictionary color conversion process as specified by Adobe.
Figure 2:
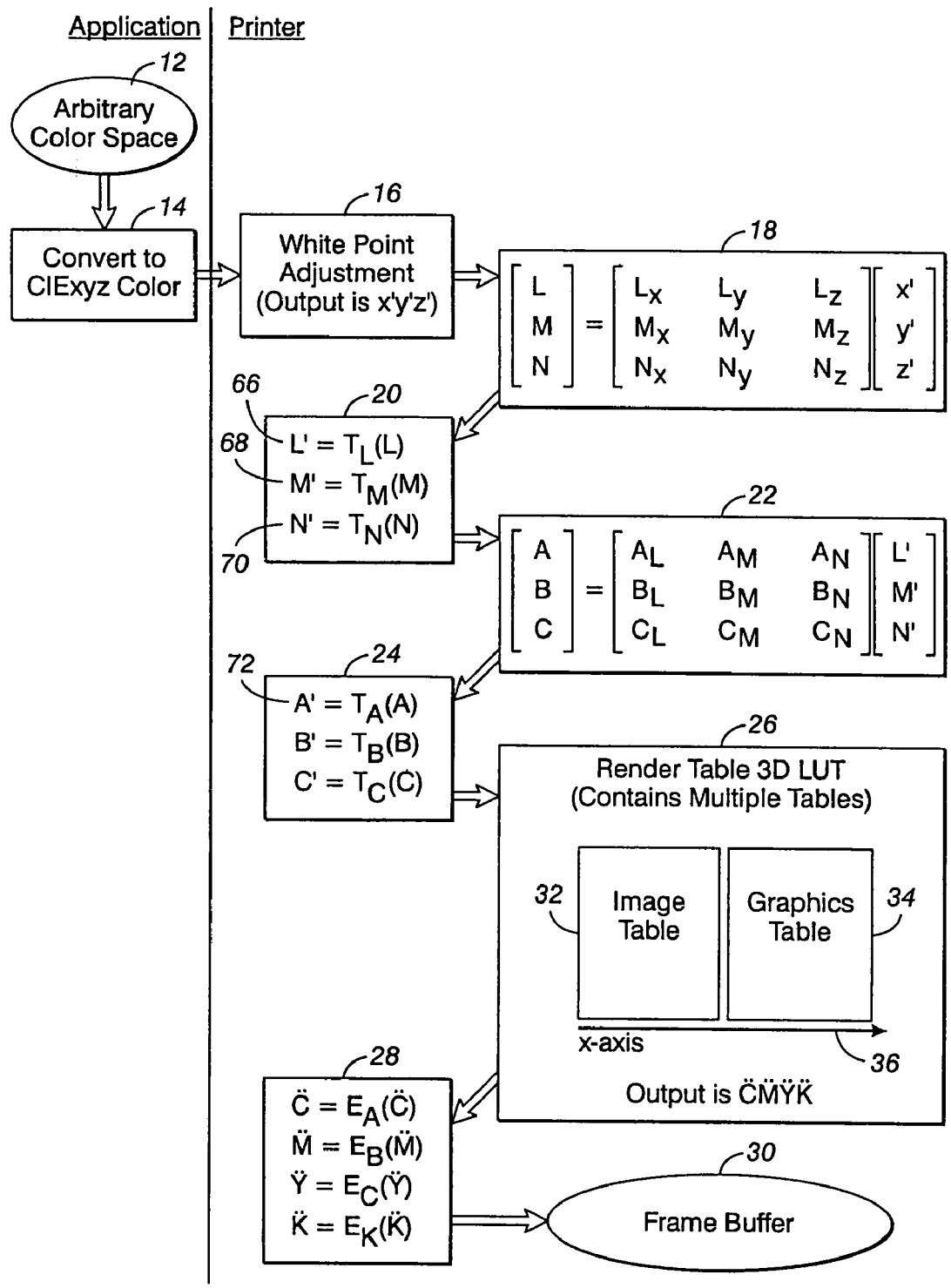
FIG. 2 illustrates a block diagram of a Dynamic Color Render Dictionary color conversion process in accordance with one embodiment of the invention.

Adobe PostScript provides a device independent method of specifying color. An example of PostScript utilizing a Color Render Dictionary color conversion process for specifying device independent color is shown in FIGS. 1 and 2. An application that uses device independent color is more likely to produce consistent looking color on a multitude of printing devices and printing technologies. The application works in a color space of its choosing 12. Generally the working space of an application is a specific calibrated device space. Some of the more powerful applications allow the user to work directly in a device independent space, namely CIEL*a*b*. The application must specify a method of converting its working color space into a CIE tristimulus space (xyz). The application accomplishes this by setting a CIEBased color spaces: CIEBasedA, CIEBasedABC, or CIEBasedDEFG. The output of any of CIEBased color spaces is always CIExyz 14.

On the printer side, it is up to the manufacturer to provide the conversion from CIExyz 14 to printer device signals, generally CMYK. The conversion from CIExyz 14 to printer device signals is accomplished through an Adobe determined sequence of mathematical manipulations. The sequence of mathematical transformations is rigidly defined, and is not configurable. However the specifics of each mathematical transformation is completely configurable. This provides a powerful and robust mechanism for color matching. The CIExyz 14 to device signals mechanism is configured through a color render dictionary.

Turning once again to FIGS. 1 and 2, the color render dictionary must specify a white point adjustment method 16. This adjusts the incoming colors for the differences in between the source color space white point and the device (destination) white point. An example of a white point adjustment 16 that is currently in use is a VonKries transform in a Linearized Bradford space.

After the white point adjustment 16, begins the multi-step process of converting the white point adjusted CIExyz signals into an interpolation space. First the adjusted CIExyz values are matrix multiplied to produce LMN values 18. The specific matrix used is specified as the MatrixLMN entry in the color render dictionary. Next the LMN signals are transformed with encoding functions 20. The encoding process produces three new values: L'M'N' 66, 68, 70, respectively in FIG. 2. The encoding functions take the form of three PostScript procedures $T_L(L)$, $T_M(M)$, and $T_N(N)$. Each of these procedures is expected to consume the input value passed to it as the topmost item on the operand stack and then push the resulting value onto the operand stack. These procedures are specified within the color render dictionary with the EncodeLMN entry.

The next step is to matrix multiply the L'M'N' signals to produce the signals ABC 22. The specific matrix used is determined by the MatrixABC entry in the color render dictionary. Next the ABC signals are transformed with encoding functions 24. The encoding process produces three new values: A'B'C'. The encoding functions take the form of three PostScript procedures $T_A(B)$, $T_B(B)$, and $T_C(C)$. Each of these procedures is expected to consume the input value passed to it as the topmost item on the operand stack and then push the resulting value onto the operand stack. These procedures are specified within the color render dictionary with the EncodeABC entry.

The A'B'C' now represent inputs to a three dimensional look up table 26. The look up table may contain any number of nodes of equally spaced nodes along each axis. Values between nodes are calculated using tri-linear interpolation. The domain of the interpolation is specified in the color render dictionary with the RangeABC entry. The results of the interpolation are intermediate device signals which would be ĊṀẎḰ. There is one last opportunity to adjust the device signals. These are the post interpolation encoding functions 28. These encoding functions are typically used to apply a tonal response curve to the device signals. The ouput of these encoding functions are ĊṀẎḰ signals, which should provide the desired color match to the requested color. At last the device signals are passed to halftoning routines, and eventually make their way into the frame buffer 30.

Adobe core code already makes the determination of each object type and uses the appropriate color pipeline. By determining which color pipeline is being used, it can be safely deduced the object type being rendered. By tracking the order in which the CRD procedures are executed, it is possible to deduce what color pipeline is being used. If the procedures are being executed in the order described in the Adobe Red Book; specifically: EncodeL, EncodeM, EncodeN, EncodeA, EncodeB, EncodeC; followed by the transform procedures in the RenderTable structure; then the object is a graphic. If there are repeated calls of the same procedure, then a cache table is being created, and the object is an image. It should be noted that there is an incredibly large number of variations for this implementation. All of the implementations must contain the following general elements: two or more CRD procedures for storing (write to memory) explicit information about when it was executed; two or more CRD procedures for reading (from memory) the stored information; and two or more CRD procedures for performing computational tasks that allows one or more of the CRD procedures to determine the type of color pipeline being used.

Referring once again to FIG. 2, the Dynamic Color Render Dictionary comprises a render table 26 which is actually a concatenation of two tables, an image table 32 and a graphic table 34. Color table concatenation may be done in the printer or on an external host (not shown). The color table is stored in the 4th element (index 3) of the RenderTable array. The color table itself is an array of strings. Color tables may be concatenated along any axis, namely A, B and C, or even along multiple axis. However, it is easiest to concatenate the tables along the A axis. In order to concatenate two color tables into a single color table along the A-axis, the strings of the color table arrays are concatenated into a single larger array. The following code fragment will perform that task on the printer: "[exch { } forall counttomark 1 add index { }forall]exch pop". This code fragment consumes the top two objects on the operand stack (which it assumes are color table arrays), then concatenates the contents of each array, and leaves the concatenation as the topmost object on the operand stack. Concatenating color tables along the B axis is accomplished by concatenating the strings themselves. Concatenating color tables along the C axis is accomplished by interleaving fixed intervals of the strings. The concatenated color table will have a total number of nodes equal to the sum of all the nodes in the individual color tables.

In accordance with one embodiment of the invention, a query is made during the $T_A(A)$ 72 encoding procedure. In this procedure a query is made to determine if a graphic object is being imaged, as will be more fully described below. If a graphic object is being imaged a large offset is added to the resulting value along an A-axis (the concatenation axis) 36. This forces the interpolation step to reference the graphics portion 34 of the render table 26. If there is no offset added, the interpolation step will reference the image portion 32 of the table 26. The space between the two tables is never referenced (it would interpolate between the two tables).

Figure 3:
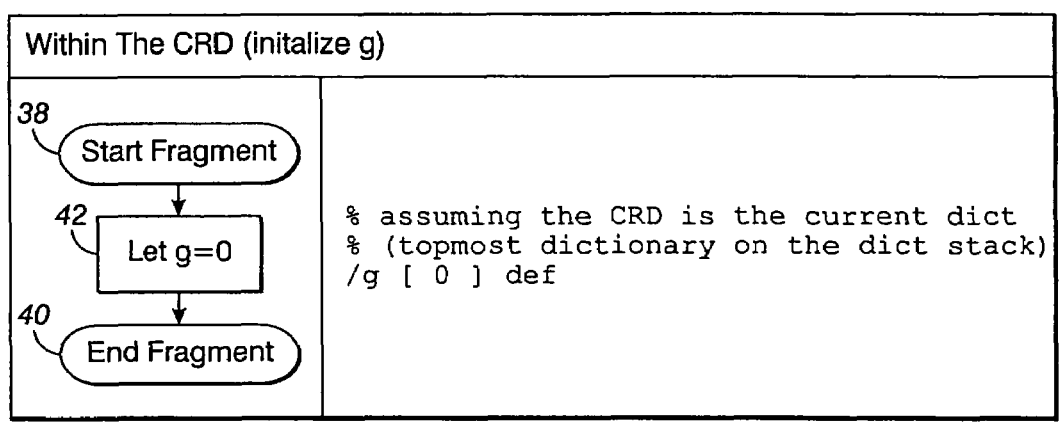
FIG. 3 is a flowchart showing the step of initializing a variable g within a Color Render Dictionary.
Figure 4:
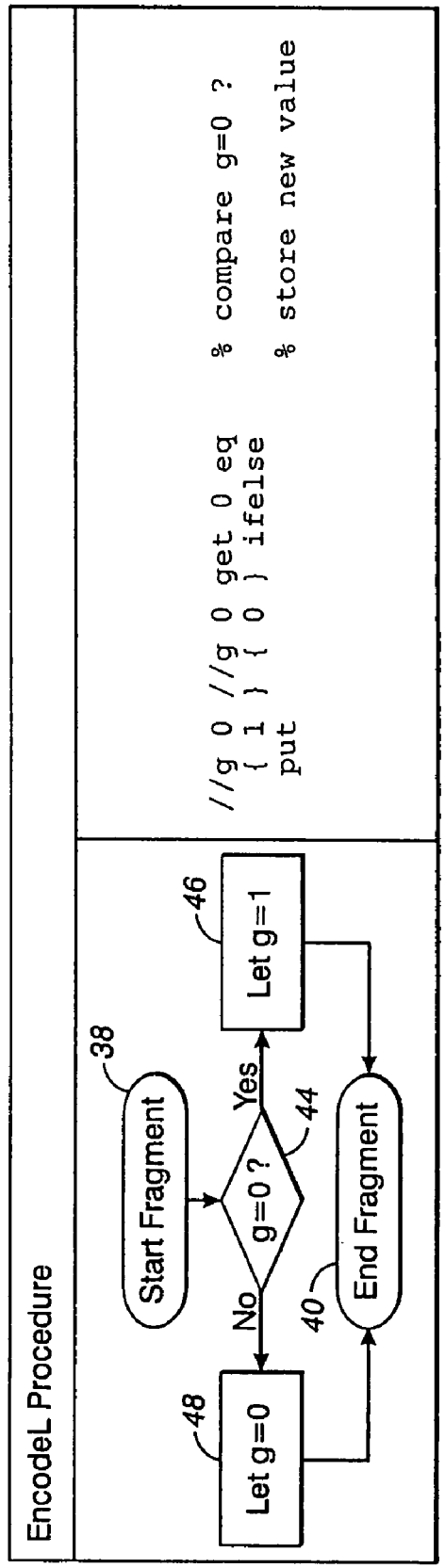
FIG. 4 is a flowchart for detecting an object type during an EncodeL procedure.
Figure 5:
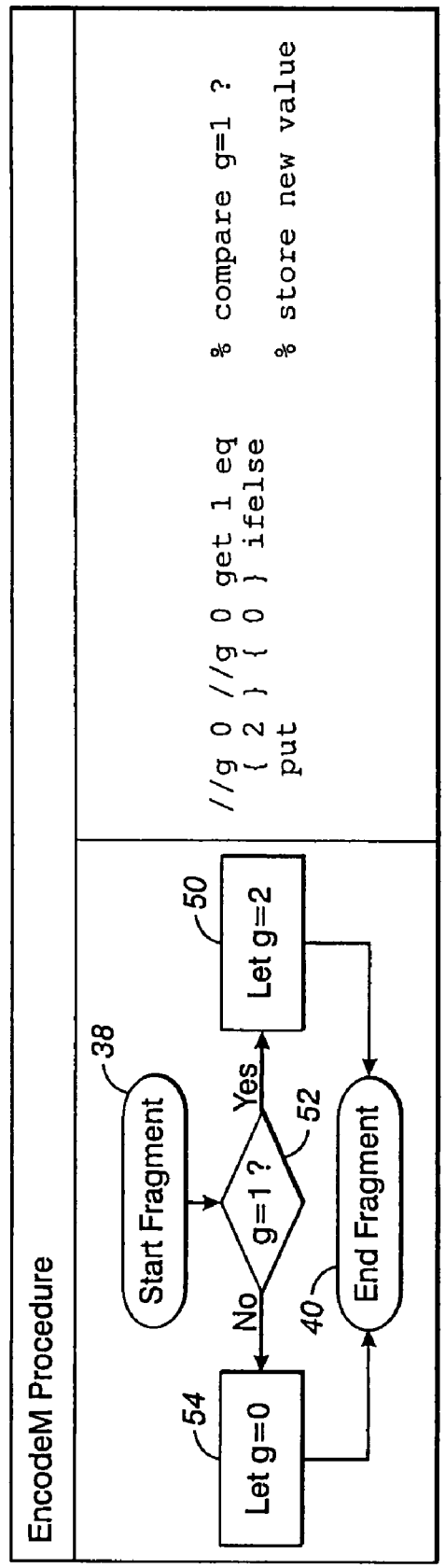
FIG. 5 is a flowchart for detecting an object type during an EncodeM procedure.
Figure 6:
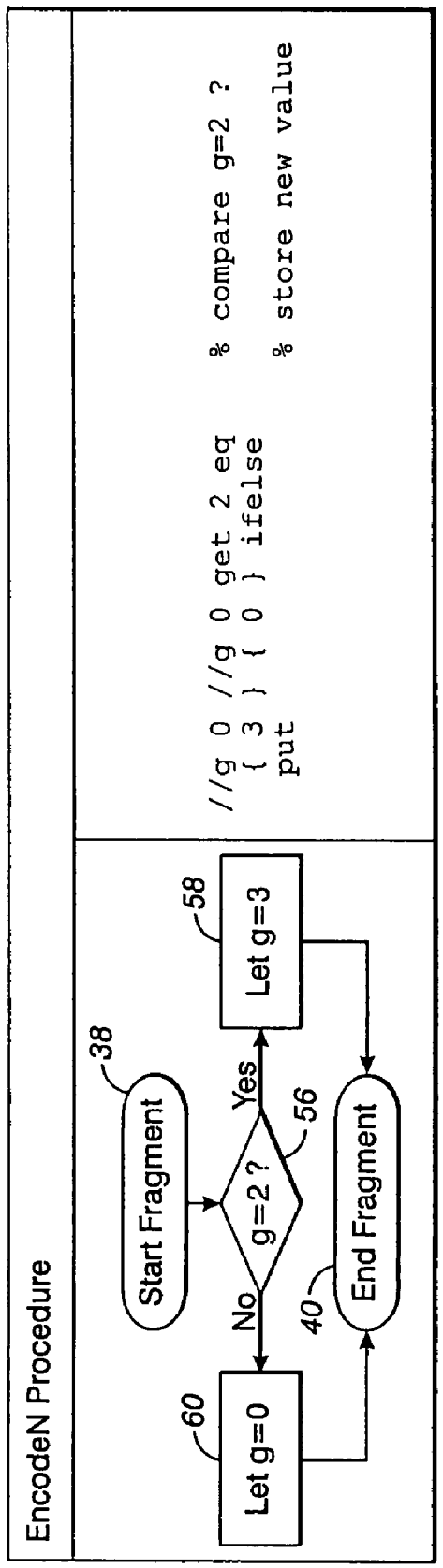
FIG. 6 is a flowchart for detecting an object type during an EncodeN procedure.

The query for the graphic detection mechanism spans several CRD procedures, and the procedures are not executed in a set sequence. This makes it difficult to construct a single flow chart and is therefore shown as a series of flowcharts in FIGS. 3 through 7. The flow charts represent logic fragments out of particular CRD procedures. Postscript does not utilize the concept of static local variables. The entire graphic detection mechanism 100 uses a single variable g wherein g is a static local variable visible only to the procedures within the CRD. In order to simulate the desired variable properties, g is defined to be an array with a single element. The value of g is placed in the array. The procedures are defined with all the references to g preceded by the immediate substitution operator, i.e. //g. This will place the value of g into the procedure at the time of definition (g is an array, and since arrays are composite objects, all instances of the array object will share the same contents.) There are other Postscript composite objects that may be used in a similar manner to achieve equivalent behavior. Turning now to FIG. 3, the variable g has to be initialized 102 by starting a code fragment in step 38 setting g equal to zero in step 42 and ending the code fragment 40 within the CRD. Initializing it in the CRD itself is a nice place to do this. The variable (a memory location) has to be defined and "visible" while the procedures are being defined. As long as the CRD is the topmost dictionary on the dictionary stack, g is visible. The next three logic/code fragments actually do the detecting as shown in FIGS. 4 through 6. They are all parts of the EncodeLMN procedures. If the EncodeLMN procedures are executed in sequence, then g will have a value of 3. For any other sequence, g will have a value that is not equal to 3. If g is equal to 3, then the procedures were executed in sequence. The CRD is being used with the accurate color pipeline. The object being rendered is a graphic. If g is not equal to 3, then the procedures were not executed in sequence. The core code is constructing a fast color cache table. The CRD is being used with the fast color pipeline. The object being rendered is an image. The method used to determine the sequence of the EncodeLMN procedures will be more frilly described below with reference to FIGS. 4 through 6 having matching Postscript code with comments mirroring each flow chart.

Referring to FIG. 4, the EncodeL procedure contains a code fragment 38 that will check 104 in step 44 the value 106 of the object detection element g of the array. The code fragment then assigns the element a new value. If the old value was 0, then the new value is 1, as shown in step 46. For all other old values the new assigned value is 0, as shown in step 48. This ends the code fragment step 40 for the EncodeL procedure.

Next, referring to FIG. 5, the EncodeM procedure contains a code fragment 38 that will check 104 in step 52 the value 106 of the object detection element g of the array. The code fragment then assigns the element a new value. If the old value was 1, then the new value is 2, as shown in step 50. For all other old values the new assigned value is 0, as in step 54. This ends the code fragment step 40 for the EncodeM procedure.

Next, referring to FIG. 6, the EncodeN procedure contains a code fragment 38 that will check 104 in step 56 the value 106 of the object detection element g of the array. The code fragment then assigns the element a new value. If the old value was 2, then the new value is 3, as shown in step 58. For all other old values the new assigned value is 0, as in step 60. This ends the code fragment step 40 for the EncodeN procedure.

Figure 7:
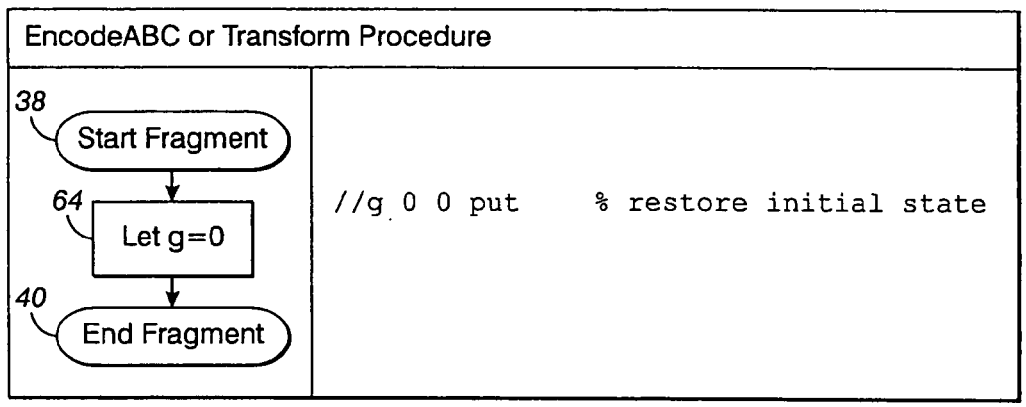
FIG. 7 is a flowchart showing the step of restoring the variable g to the initial state within the Color Render Dictionary.

After all the CRD procedures have been defined, then the reference to g within the CRD may be removed. This will avoid the potential problem of the variable g being referenced by some other Postscript job. The information about the object type may be used in the EncodeABC procedures and/or the transform procedures specified within the RenderTable. It is important that the last reference to g resets the state back to its initial condition. This is done as shown in FIG. 7 wherein a code fragment is step 38 resets g equal to zero in step 64 ending this fragment in step 40. If this is not done, then the graphic detection mechanism may produce incorrect results for subsequent queries. There is a high likelihood that the name g might be used by someone else for some other purpose. Undefining the variable prevents the interpreter from confusing this variable with someone else's.

In summary a mechanism for differentiation between image and graphic objects 100 is entirely contained within the CRD wherein the differentiation between image and graphic objects is accomplished by monitoring 104 the sequence in which the EncodeLMN procedures are executed 106. When the EncodeL, EncodeM, and EncodeN procedures are executed in that order, a graphic object is being processed/rendered 108. If the EncodeLMN procedures are executed in any other sequence, an image object is being processed/rendered 108.

Figure 8:
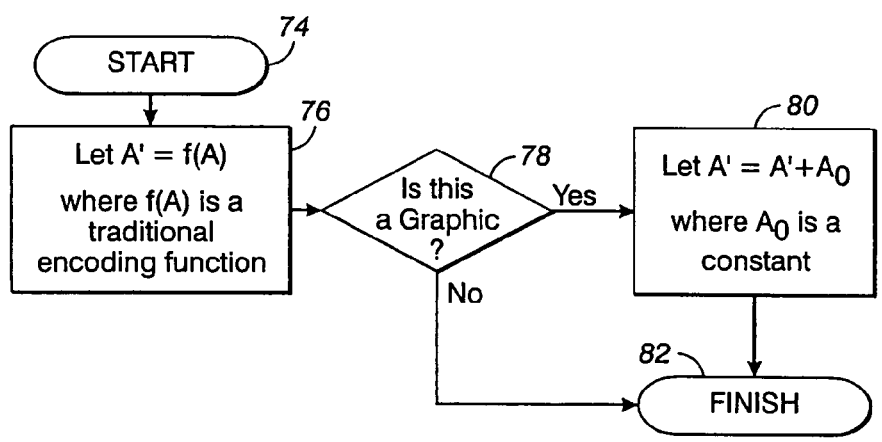
FIG. 8 is a flowchart showing an example of using an encoding function for performing dynamic referencing into a render table.

FIG. 8 is a representation of the table selection mechanism. This flowchart represents the code that makes up the EncodeA procedure 72. When the EncodeA procedure is initiated 74, 102, it is passed an input value of A. The EncodeA procedure then performs an arbitrary encoding 76. The result of this encoding is assigned to the variable A'. This arbitrary encoding includes all the functionality originally defined by Adobe.

All of the remaining processing is strictly related to the table switching mechanism. The next step is to determine if the current object type being rendered is a graphic 106. This is a Boolean test 78, and may be accomplished by comparing the state variable g to 3, 78. If the state variable g is equal to three, then a graphic object is being rendered, otherwise the object type being rendered must be an image. If the object type being prendered is an image, then no more processing is required, and the EncodeA procedure ends execution 82. If the object type being rendered is a graphic, then the value of A' needs to be translated into the virtual domain of the graphics table 80. This is accomplished by adding the constant A0 to the value of A'. The value of A0 may be calculated using the following equation: $A0=u0-v0+(Nu(u1-u0)/(Nu-1))$, where [u0,u1] is the domain of the image color table along the concatenated axis, and Nu is the number of nodes in the image color table along the concatenated axis; and [v0,v1] is the domain of the graphics color table along the concatenated axis, and Nv is the number of nodes in the graphics color table along the concatenated axis. Once this is done, the EncodeA procedure ends execution 82.

Figure 9:
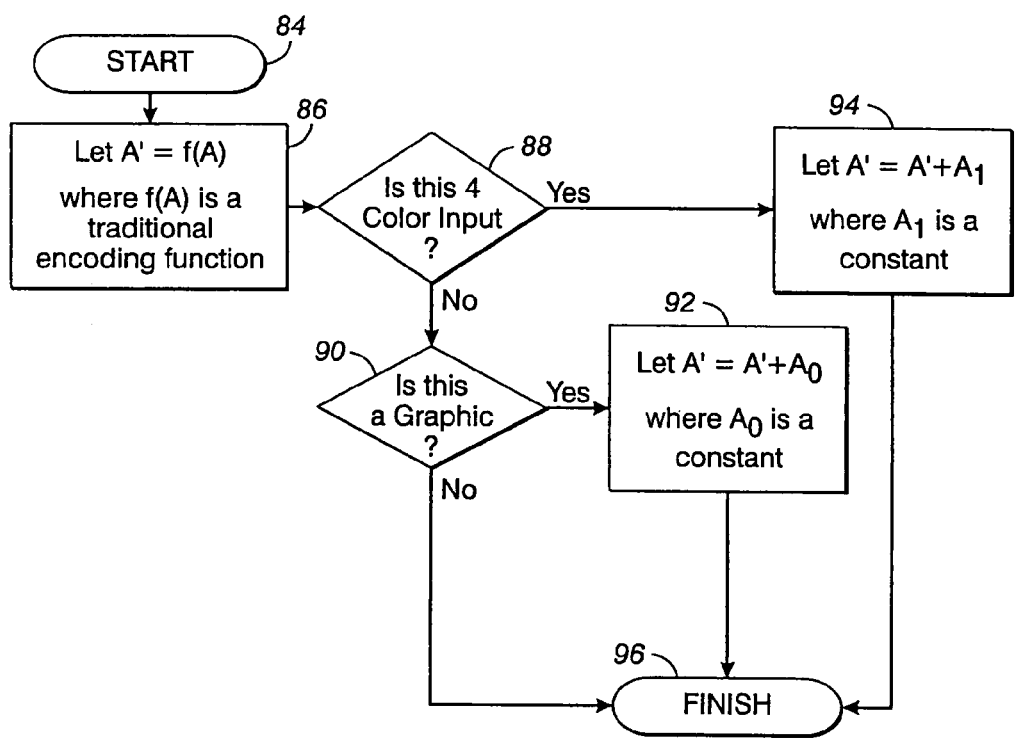
FIG. 9 is a flowchart showing another example of using the encoding function for performing dynamic referencing into the render table.
Figure 10:
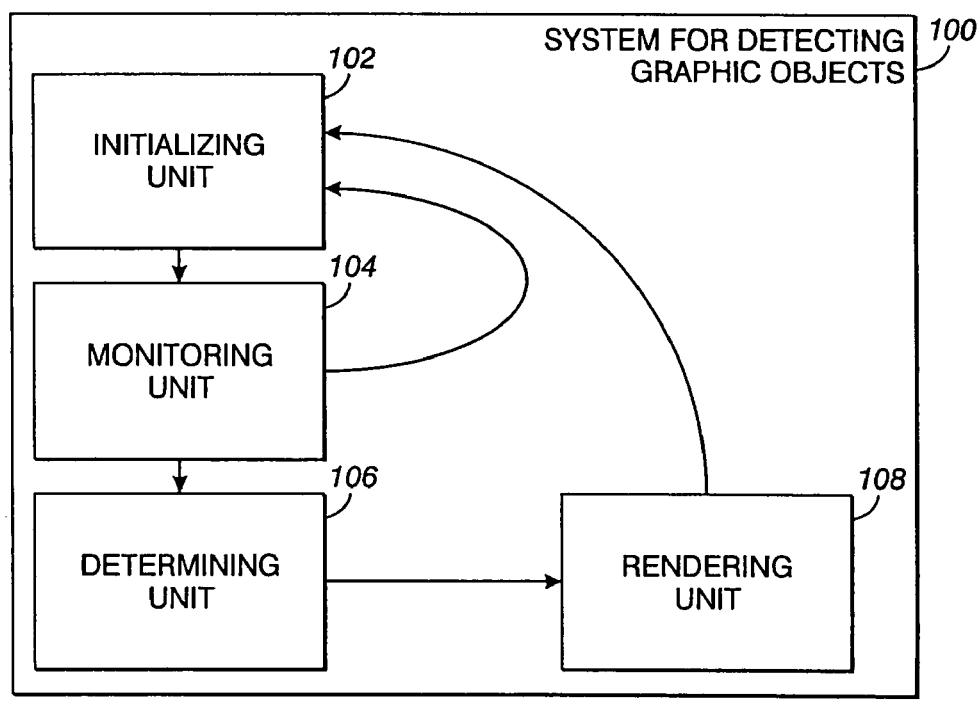
FIG. 10 is a flowchart showing a system for detecting graphical objects.

FIG. 9 represents an alternative implementation of the table switching mechanism. In this implementation it is assumed that there are three color tables concatenate into the RenderTable: an image table, a graphics table, and a colorimetric match table. Execution of the EncodeA procedure begins 84. The procedure is passed an input value of A. The EncodeA procedure then performs an arbitrary encoding 86. The result of this encoding is assigned to the variable A'. This arbitrary encoding includes all the functionality originally defined by Adobe. FIG. 10 is a representation of an exemplary graphic object detection system 100. The system 100 comprises an Initialization unit 102, a Monitoring unit 104, a Determining unit 106, and a Rendering unit 108. The Initialization unit initializes, resets, or increments a counter variable according to the sequence in which EncodeLMN procedures are executed in a Postscript application. The Monitoring unit monitors EncodeLMN sequences. The Determining unit determines whether a specific EncodeLMN sequence was executed by the Postscript application. The Rendering unit either renders a graphic object or an image object once a specific EncodeLMN procedure is determined. Finally, the Initialization unit resets the counter variable to its initial state after the rendering unit renders a graphic or image object.

All of the remaining processing is strictly related to the table switching mechanism. The first step is to check if the color being processed has been specified as a four color input 88. Four color inputs most likely represent press CMYK values, and might represent pantone spot colors. For these cases it is most desirable to render the object using a colorimetric intent (truly attempt to match the color as closely as possible). Determining the number of color input channels is a trivial task in PostScript 106. It may easily be accomplished with the following code fragment: mark current color count to mark. If the result of this query is equal to four, then the colorimetric table needs to be selected. The colorimetric table is selected by adding the constant A1 to the value of A' 94. This translates A' into the virtual domain of the colorimetric table. The value of A1 may be calculated using the following equation: $A1=(v0-w0)+((Nu+Nv)(v1-v0)/(Nu-1))$, where [u0,u1] is the domain of the image color table along the concatenated axis, and Nu is the number of nodes in the image color table along the concatenated axis; and [v0,v1] is the domain of the graphics color table along the concatenated axis, and Nv is the number of nodes in the graphics color table along the concatenated axis; and [w0, w1] is the domain of the graphics color table along the concatenated axis, and Nw is the number of nodes in the graphics color table along the concatenated axis. Once the colonmetric table has been selected, then execution of the EncodeA procedure may end 96.

If at step 88 it is determined 106 that the current color has not been specified as a four color input, then processing continues as follows. The next step is to determine 106 if the current object type being rendered is a graphic 90. This is a Boolean test 106 and may be accomplished by comparing the state variable g to 3. If the state variable g is equal to three, then a graphic object is being rendered, otherwise the object type being rendered must be an image. If the object type being prendered is an image, then no more processing is required, and the EncodeA procedure ends execution 96. If the object type being rendered is a graphic, then the value of A' needs to be translated into the virtual domain of the graphics table 92. This is accomplished by adding the constant A0 to the value of A'. The value of A0 is may be calculated using the following equation: $A0=u0-v0+(Nu(u1-u-0)/(Nu-1))$, where [u0,u1] is the domain of the image color table along the concatenated axis, and Nu is the number of nodes in the image color table along the concatenated axis; and [v0,v1] is the domain of the graphics color table along the concatenated axis, and Nv is the number of nodes in the graphics color table along the concatenated axis. Once this is done, the EncodeA procedure ends execution 96.

The value of the object type detection 102, 104 element of the array may be used in any of the following CRD procedures: EncodeA, EncodeB, EncodeC, and all of the RenderTable transform procedures. The value of the object detection 102, 104 element of the array is used to intelligently alter/switch the color behavior of the rendering 108. One of these procedures must also reset the value of the element to its initial value of 0 102. There are multiple color tables concatenated into a single CRD Render Table entry. Each color table contains data for a distinct color behavior. Individual color tables are accessed by adding constant offsets to the indexing axis of the RenderTable.

Figure 11:
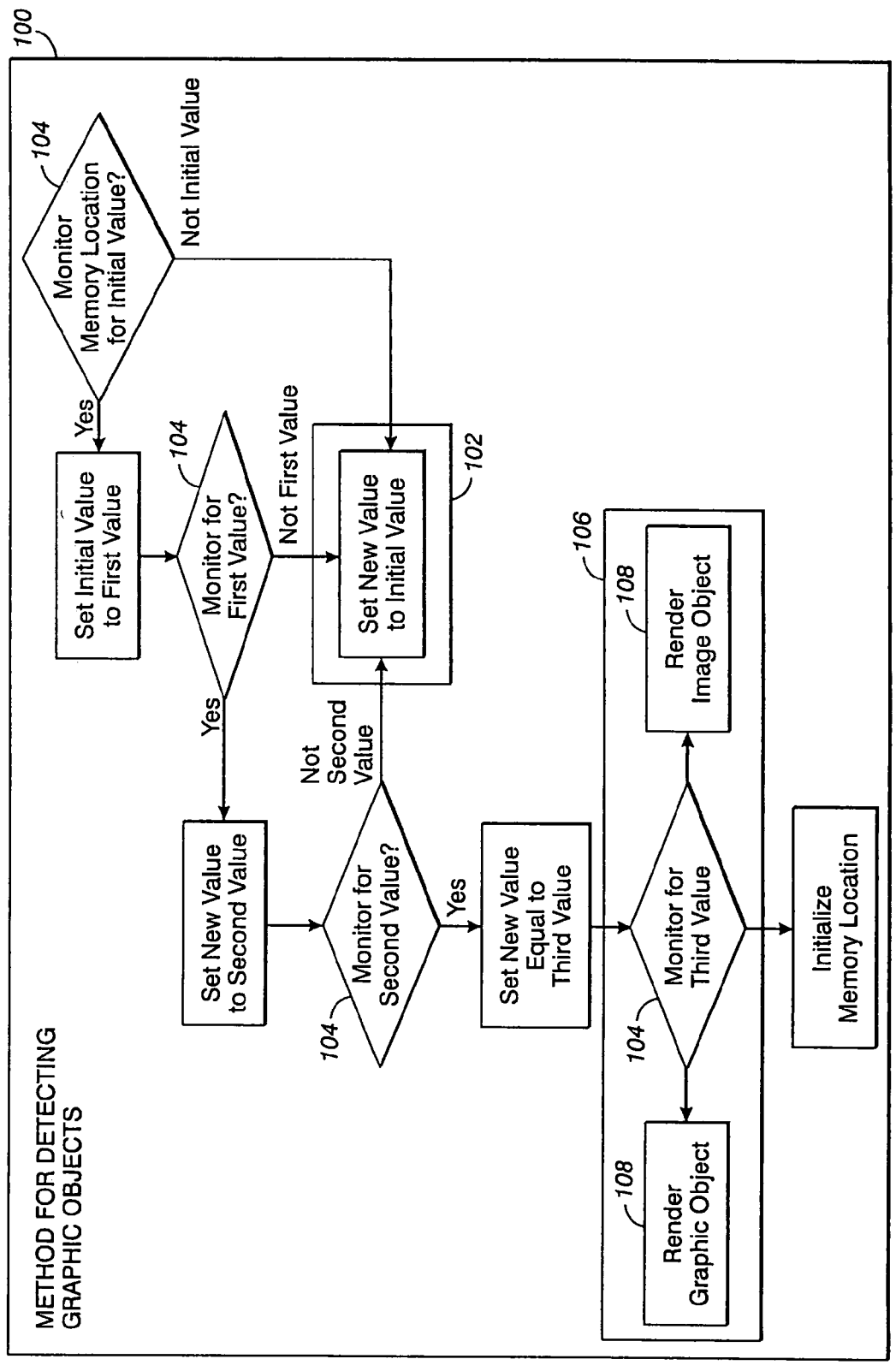
FIG. 11 is a flowchart showing a method for detecting graphical objects.

FIG. 11 is a flowchart showing a method for detecting graphical objects.

A typical CRD color transformation process is static. In other words the resulting color is only a function of the color that the application asked for. This doesn't truly fulfill the needs of an increasingly color savvy printer market. Users expect great color while printing both images and graphics. In practice, the best color match for graphics is significantly different than the best color match for images. A good graphics color match will produce vibrant saturated colors at the cost of matching lightness and/or hue. In contrast a good image color match will sacrifice saturation in order to better preserve hue and lightness. Traditional approaches for generating color render dictionaries involve finding the best compromise between the color matching styles. The ability to provide a multitude of color behaviors within a single Color Render Dictionary alleviates the need to make this compromise. This results in over-all better color matching.

A very non-conventional use of the existing mechanism (and code) causing the CRD to be dynamic is also disclosed. A single PostScript Color Render Dictionary (CRD) automatically produces a multitude of color rendering intents within a single graphic state. This allows the resulting color to depend on more than just the color the application requested. There may be multiple rendering intents that are automatically and intelligently selected. Selection criteria may include and is not limited to: the input color space, the object type being rendered, and/or the actual input color.

It is appreciated that various other alternatives, modifications, variations, improvements, equivalents or substantial equivalents of the teachings herein that for example, are or may be presently unforeseen, unappreciated or subsequently arrived at by applicants or others are also intended to be encompassed by the claims and amendments thereto.

What is claimed is:

1. A method for detecting graphic objects within Color Rendering Dictionaries, comprising:
   monitoring sequence orders in which Color Rendering Dictionaries procedures are executed in a Postscript application; and determining, based on the monitored sequence order, whether an image or a graphic object is to be used for rendering.

2. The method for detecting graphic objects within Color Rendering Dictionaries according to claim 1, further comprising:
   initializing a memory location with an initial value within said Color Rendering Dictionaries.

3. The method for detecting graphic objects within Color Rendering Dictionaries according to claim 2, further comprising:
   monitoring said memory location during a first Color Rendering Dictionary procedure form said initial value;
   setting a new value equal to a first value when the first Color Rendering Dictionary procedure has said initial value; and
   setting a new value equal to said initial value when the first Color Rendering Dictionary procedure does not have said initial value.

4. The method for detecting graphic objects within Color Rendering Dictionaries according to claim 3, further comprising:
   monitoring said memory location during a second Color Rendering Dictionary procedure for said first value;
   setting a new value equal to a second value when the second Color Rendering Dictionary procedure has said first value.
   setting a new value equal to said initial value when the second Color Rendering Dictionary procedure does not have said first value.

5. The method for detecting graphic objects within Color Rendering Dictionaries according to claim 4, further comprising: monitoring said memory location during a third Color Rendering Dictionary procedure for said second value;

setting a new value equal to a third value when the third Color Rendering Dictionary procedure has said second value; and setting a new value equal to said initial value when the third Color Rendering Dictionary procedure does not have said second value.

6. The method for detecting graphic objects within Color Rendering Dictionaries according to claim 5, further comprising: monitoring said memory location for said third value;

rendering an graphic object when said memory location is equal to said third value; and rendering an image object when said memory location is not equal to said third value.

7. The method for detecting graphic objects within Color Rendering Dictionaries according to claim 6, further comprising:

resetting memory location to said initial value after all Color Rendering Dictionary procedures.

8. The method for detecting graphic objects within Color Rendering Dictionaries according to claim 4, further comprising:

monitoring said memory location for said second value;

rendering a graphic object when said memory location is equal to said second value; and rendering an image object when said memory location is not equal to said second value.

9. The method for detecting graphic objects within Color Rendering Dictionaries according to claim 1, further comprising:

monitoring and determining image and graphic objects is accomplished entirely within said Color Rendering Dictionary.

10. The method for detecting graphic objects within Color Rendering Dictionaries according to claim 1, further comprising:

monitoring an order in which EncodeL, EncodeM, and EncodeN procedures are executed;

processing/rendering a graphic object when a EncodeL, EncodeM, and EncodeN procedures are executed in that particular sequence order; and processing/rendering and image object when EncodeL, EncodeM, and EncodeN procedures are not executed in that particular sequence order.

11. system for detecting graphic objects within Color Rendering Dictionaries, comprising:

a monitoring unit that monitors sequences in which EncodeLMN procedures are executed in a Postscript application; and a determining unit that determines, based on the monitored sequence order, whether an image or a graphic object is to be used.

12. The system for detecting graphic objects within Color Rendering Dictionaries according to claim 11, further comprising:

an initializing unit that initializes an object type detection element with an initial value within a Color Rendering Dictionary.

13. The system for detecting graphic objects within Color Rendering Dictionaries according to claim 12:

wherein the monitoring unit monitors the object type element during an EncodeL procedure for said initial value;

wherein the initializing unit sets a new value equal to a first value when the object type element has said initial value during the EncodeL procedure; and wherein the initializing unit that sets a new value to said initial value when the object type element does not have said initial value during the EncodeL procedure.

14. The system for detecting graphic objects within Color Rendering Dictionaries according to claim 13, monitoring unit monitors the object type element during an EncodeM procedure for said first value;

wherein the initializing unit sets a new value equal to a second value when the object type element has said first value during the Encode M procedure; and wherein the initializing unit sets a new value equal to said initial value when the object element does not have said first value during the EncodeM procedure.

15. The system for detecting graphic objects within Color Rendering Dictionaries according to claim 14, wherein the monitoring unit monitors the object type element during an EncodeN procedure for said second value;

wherein the initializing unit sets a new value equal to a third value when the object type element has said second value during the EncodeN procedure; and wherein the initializing unit sets a value equal to said initial value when the object type element does not have said second value during the EncodeN procedure.

16. The system for detecting graphic objects within Color Rendering Dictionaries according to claim 15, wherein the monitoring unit monitors the object type element for said third value, the system further comprising a rendering unit that renders a graphic object when the object type element is equal to said third value, and renders an image object when the object type element is not equal to said third value.

17. The system for detecting graphic objects within Color Rendering Dictionaries according to claim 16:

wherein the initialization unit initializes said object type detection element to a value of zero within said Color Rendering Dictionary after rendering an image or graphic object.

18. The system for detecting graphic objects within Color Rendering Dictionaries according to claim 11, further comprising:

a defining unit that defines Adobe PostScript variable 'g' as said object type detection element within said Color Rendering Dictionary.

19. The system for detecting graphic objects within Color Rendering Dictionaries according to claim 11:

wherein the monitoring and determining units differentiate between image and graphic objects exist entirely within said Color Rendering Dictionary.

20. A method for detecting graphic objects comprising:

monitoring an execution sequence of Color Rendering Dictionary procedures;

processing/rendering a graphic object when the Color Rendering Dictionary procedures are executed in a predetermined sequence; and processing/rendering an image object when the Color Rendering Dictionary procedures are not executed in a predetermined sequence.

* * * * *